(12) United States Patent
Ueda et al.

(10) Patent No.: US 9,312,070 B2
(45) Date of Patent: Apr. 12, 2016

(54) MULTILAYER CERAMIC CAPACITOR

(71) Applicant: TAIYO YUDEN CO., LTD., Taito-ku, Tokyo (JP)

(72) Inventors: Shusaku Ueda, Takasaki (JP); Noriyuki Chigira, Takasaki (JP); Shinichi Abe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 176 days.

(21) Appl. No.: 14/033,197

(22) Filed: Sep. 20, 2013

(65) Prior Publication Data

US 2014/0085769 A1  Mar. 27, 2014

(30) Foreign Application Priority Data

Sep. 25, 2012 (JP) ................................. 2012-210503

(51) Int. Cl.
| | |
|---|---|
| *H01G 4/06* | (2006.01) |
| *H01G 4/30* | (2006.01) |
| *H01G 4/12* | (2006.01) |
| *H01G 4/008* | (2006.01) |
| *C04B 35/468* | (2006.01) |
| *B82Y 30/00* | (2011.01) |

(52) U.S. Cl.
CPC .............. *H01G 4/1209* (2013.01); *B82Y 30/00* (2013.01); *C04B 35/4682* (2013.01); *H01G 4/0085* (2013.01); *H01G 4/30* (2013.01); *C04B 2235/3206* (2013.01); *C04B 2235/3224* (2013.01); *C04B 2235/3236* (2013.01); *C04B 2235/3262* (2013.01); *C04B 2235/3418* (2013.01); *C04B 2235/5445* (2013.01); *C04B 2235/6584* (2013.01); *C04B 2235/663* (2013.01); *C04B 2235/761* (2013.01); *C04B 2235/781* (2013.01); *C04B 2235/785* (2013.01); *H01G 4/1227* (2013.01)

(58) Field of Classification Search
CPC ........ H01G 4/30; H01G 4/232; H01G 4/1227
USPC .................................. 361/321.1, 301.4, 321.2
See application file for complete search history.

(56) References Cited

U.S. PATENT DOCUMENTS

| | | | |
|---|---|---|---|
| 2004/0188002 A1 | 9/2004 | Kawamura et al. | |
| 2007/0104640 A1* | 5/2007 | Kawamura et al. | 423/598 |
| 2007/0104970 A1 | 5/2007 | Kawamura et al. | |
| 2012/0127626 A1* | 5/2012 | Chang et al. | 361/301.4 |

FOREIGN PATENT DOCUMENTS

| | | |
|---|---|---|
| JP | 2010-010157 A | 1/2010 |
| TW | I304056 B | 12/2008 |

OTHER PUBLICATIONS

A Notification of Examination Opinions with Search Report issued by Taiwan Intellectual Property Office, mailed Oct. 16, 2014, for Taiwan counterpart application No. 102129161.

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

A multilayer ceramic capacitor has multiple laminated dielectric ceramic layers made of a dielectric ceramic, internal electrodes formed between the dielectric ceramic layers, and external electrodes electrically connected to the internal electrodes, wherein generation of cracks in the dielectric layer due to expansion of the internal electrode is suppressed by causing ceramic grains having a crystal axis ratio c/a higher than that of the ceramic grains constituting the dielectric layer to be present in non-contiguous parts of the internal electrodes between the dielectric ceramic layers, and by harnessing the stress-mitigating effect of domain switching involving these ceramic grains.

8 Claims, 2 Drawing Sheets

MULTILAYER CERAMIC CAPACITOR

FIELD OF THE INVENTION

The present invention relates to a multilayerceramic capacitor, and specifically to a dielectric material used for multilayerceramic capacitors with internal electrodes.

DESCRIPTION OF THE RELATED ART

A multilayer ceramic capacitor has a ceramic laminate constituted by multiple dielectric ceramic layers, as well as multiple internal electrodes formed in such a way that each internal electrode is led to a different end face alternately via the dielectric ceramic layer and, and external electrodes are formed on both end faces of the ceramic laminate in a manner electrically connected to the internal electrodes.

For the dielectric ceramics used for such multilayer ceramic capacitor, primarily barium titanate ($BaTiO_3$) is used. Such dielectric ceramic of barium titanate provides benefits in that it can be sintered simultaneously with Ni internal electrodes in a reducing atmosphere and that its dielectric constants is high at 7000 or more, which is advantageous for size reduction and capacity increase.

The aforementioned multilayer ceramic capacitor is generally manufactured as follows.

The content of each oxide in the dielectric material is determined so that the specified dielectric porcelain composition will be achieved after sintering, and a binder and solvent are added to and mixed with the obtained dielectric material to prepare a slurry for ceramic dielectric layer, after which the slurry is coated with the doctor blade method to form a green sheet. A Ni internal electrode paste is then printed on the surface of the obtained green sheet to prepare a ceramic sheet for a capacitance-forming area having an internal electrode pattern, and a multiple number of ceramic sheets thus prepared are laminated in such a way that, when the ceramic sheets are cut to an individual laminate chip, the ends of the internal electrode patterns will be exposed alternately on the pair of opposite end faces of the laminate chip, and then protective green sheets not having any internal electrode pattern printed on them are laminated and pressure-bonded on top and bottom of the ceramic sheets, after which the obtained laminate is cut to a specified size to obtain a laminate chip. Next, the obtained laminate chip is put through a binder removal process and then sintered, and also annealed, to obtain a sintered compact. Next, the end faces of the obtained sintered compact are polished and external electrodes are applied and baked to obtain a multilayer ceramic capacitor.

Conventionally the Ni internal electrode paste for multilayer ceramic capacitors is blended with a ceramic powder of $BaTiO_3$, etc. That is because if the adhesion between the laminated dielectric layers and internal electrodes weakens, the acquisition capacity will drop. Accordingly, a ceramic powder is added to form dielectric ceramics in non-contiguous parts of the internal electrodes to increase the adhesion between the dielectrics and electrodes.

On the other hand, the multilayer ceramic capacitor receives thermal shock when solder-mounted, and the Ni electrodes in the capacitor expand as a result. The rate of expansion of Ni is greater than that $BaTiO_3$ or other dielectric material, so if the strength of the dielectric ceramics in non-contiguous parts of the internal electrodes is not sufficient, cracks will form in the capacitor (refer to FIG. 2).

To solve the aforementioned problem, Patent Literature 1 proposes a multilayer ceramic capacitor characterized in that the grain size of the dielectric ceramic sandwiched by the internal electrodes in the laminating direction is 80 to 350 nm and that the grain size of the dielectric ceramic present in non-contiguous parts of the internal electrodes between the dielectric ceramic layers is 2.0 to 6.0 times the grain size of the dielectric ceramic sandwiched by the internal electrodes in the laminating direction, wherein such multilayer ceramic capacitor, because of the increased grain size of the dielectric ceramic present in non-contiguous parts, offers greater mechanical strength and suppresses generation of cracks in the dielectric layers due to expansion of the internal electrodes.

BACKGROUND ART LITERATURES

[Patent Literature 1] Japanese Patent Laid-open No. 2010-10157

SUMMARY

FIG. 2 shows the mechanism of how a crack generates, when Ni is used for the internal electrode, in the dielectric ceramic due to expansion of the Ni internal electrode. FIG. 3 shows the condition where generation of cracks is prevented by the presence of ceramic grains of larger grain size in non-contiguous parts of the Ni internal electrode 11 pursuant to Patent Literature 1 above.

As shown in FIG. 2, a sudden rise in temperature during mounting causes the Ni internal electrode 11 to expand in the direction shown by the thick arrows in FIG. 2, but if the grain size of the dielectric ceramic 13 present in non-contiguous parts of the Ni internal electrode 11 between the dielectric ceramic 12 layers is the same as the grain size of the dielectric ceramic 12 sandwiched by the Ni internal electrodes 11 in the laminating direction, and smaller than the thickness of the Ni internal electrode, then this expansion will not be followed and a crack generates as indicated by a bold line.

On the other hand, if the grain size of the dielectric ceramic 13 present in non-contiguous parts of the Ni internal electrode 11 is greater than the grain size of the dielectric ceramic 12 sandwiched by the Ni internal electrodes 11 in the laminating direction, and roughly the same as the thickness of the Ni internal electrode 11, as shown in FIG. 3, then the mechanical strength of the dielectric ceramic 13 will increase and at the same time the expansion of the Ni internal electrode 11 will be absorbed by these grains, and generation of cracks will be suppressed as a result.

However, increasing the mechanical strength alone has not been proven sufficient in suppressing the generation of cracks in the dielectric layer.

The present invention was developed in light of the aforementioned situation and an object of the present invention is to provide a multilayer ceramic capacitor that can suppress generation of cracks in the dielectric layer due to expansion of the internal electrode.

After studying repeatedly to improve the aforementioned problems, the inventors of the present invention gained knowledge that, by causing ceramic grains having a crystal axis ratio c/a higher than that of the ceramic grains constituting the dielectric layer (these grains may be hereinafter simply referred to as "ceramic grains of the higher c/a") to be present in non-contiguous parts of the internal electrodes between the dielectric ceramic layers, and by harnessing the stress-mitigating effect of domain switching involving these ceramic grains, generation of cracks in the dielectric layer due to expansion of the internal electrode can be suppressed. The non-contiguous parts exist along a direction in which the internal electrode extends as a result of sintering (the non-contiguous parts are first generated while being sintered).

The present invention, developed based on the aforementioned knowledge, is specified below.

[1] A multilayer ceramic capacitor having multiple laminated dielectric ceramic layers made of dielectric ceramic, internal electrodes formed between the dielectric ceramic layers, and external electrodes electrically connected to the internal electrodes, wherein such multilayer ceramic capacitor is characterized in that ceramic grains having a crystal axis ratio c/a higher than that of the ceramic grains constituting the dielectric ceramic layer are present in non-contiguous parts of the internal electrodes between the dielectric ceramic layers by an area ratio of 15% or more in the non-contiguous parts.

[2] A multilayer ceramic capacitor according to [1], characterized in that the average grain size of the ceramic grains present in the non-contiguous parts is 0.15 to 3.00 μm.

[3] A multilayer ceramic capacitor according to [1] or [2], characterized in that the percentage of the internal electrode occupied by the ceramic is 8 to 40%.

[4] A multilayer ceramic capacitor according to any one of [1] to [3], characterized in that the dielectric ceramic layer is made of a dielectric ceramic whose primary component is barium titanate perovskite solid solution.

According to the present invention, generation of cracks in the dielectric layer due to expansion of the internal electrode can be suppressed by causing ceramic grains having a crystal axis ratio c/a higher than that of the ceramic grains constituting the dielectric layer to be present in non-contiguous parts of the internal electrodes between the dielectric ceramic layers by an area ratio of 15% or more in the non-contiguous parts, and by harnessing the stress-mitigating effect of domain switching involving these ceramic grains.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
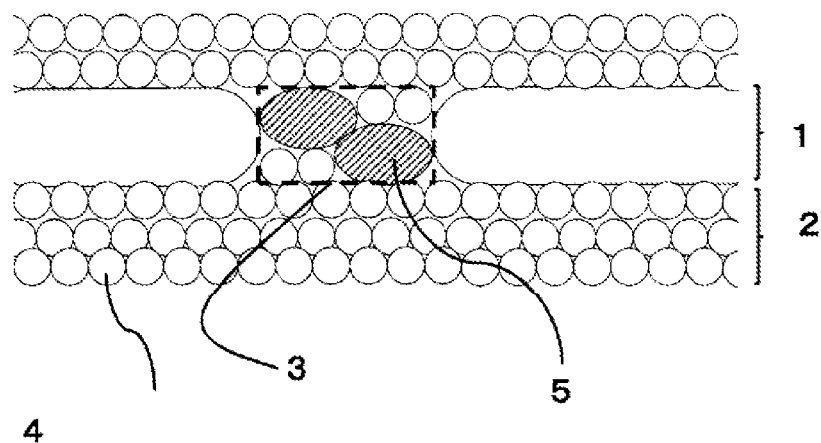
FIG. 1 is a drawing that schematically explains the present invention
Figure 2:
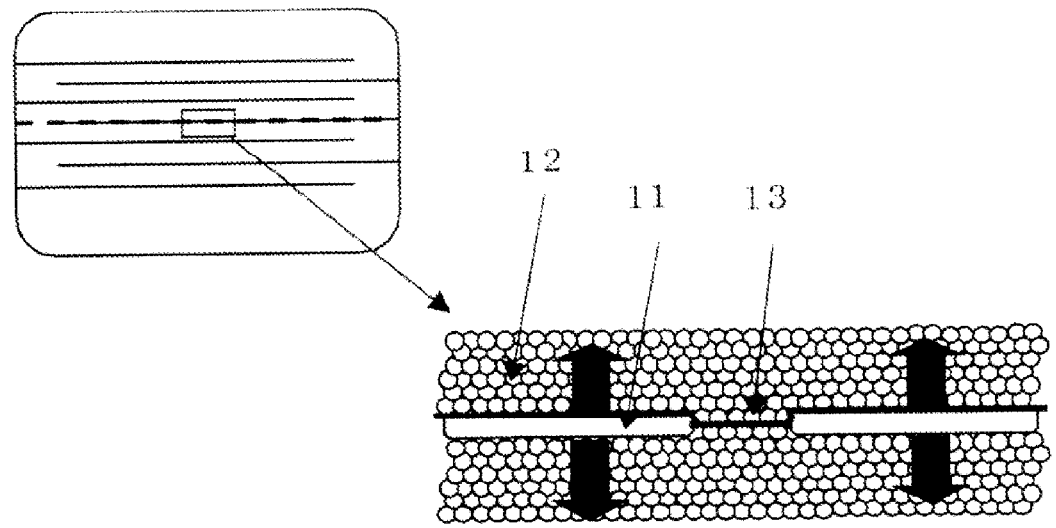
FIG. 2 is a drawing showing the mechanism of how a crack generates, when Ni is used for the internal electrode, in the dielectric ceramics due to expansion of the Ni internal electrode
Figure 3:
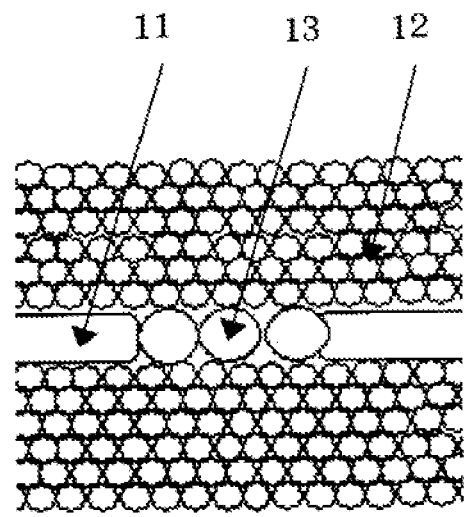
FIG. 3 is a drawing showing the condition where generation of cracks is prevented by the presence of ceramic grains of larger grain size pursuant to Patent Literature 1

1: Internal electrode
2: Dielectric ceramic layer
3: Non-contiguous part of internal electrode
4: Ceramic grain
5: Ceramic grain of higher c/a
11: Ni internal electrode
12: Dielectric ceramic sandwiched by Ni internal electrodes in laminating direction
13: Dielectric ceramic present in non-contiguous parts of Ni internal electrode between dielectric ceramic layers

DETAILED DESCRIPTION OF EMBODIMENTS

FIG. 1 is a drawing that schematically explains the present invention, and indicates that ceramic grains 5 having a crystal axis ratio c/a higher than the crystal axis ratio c/a of ceramic grains 4 constituting the dielectric ceramic layer are present among the ceramic grains constituting non-contiguous parts 3 of an internal electrode 1 between dielectric ceramic layers 2.

A domain is a streaky pattern observed by a TEM (transmission electron microscope) on a section of dielectric ceramic, manifesting by spontaneous polarization of crystal grains. If a domain forms random polarizations in a sintered ceramic compact and the outer shape of the sintered ceramic compact deforms, then internal energy will be released as a result of flipping of the polarized domain by 90 degrees relative to the deformation (domain switching).

The grains of the higher crystal axis ratio c/a require less energy to be flipped and thus can be flipped relatively easily, and as a result of the flipping, the grains will be able to deform easily under stress generated by thermal expansion and mitigate the stress.

According to the present invention, the stress-mitigating effect of this domain switching can be harnessed by causing these ceramic grains 5 of the higher crystal axis ratio c/a to be present in the non-contiguous parts 3 of the internal electrodes between the dielectric ceramic layers by an area ratio of 15% or more in the non-contiguous parts, in order to prevent destruction of the dielectric layers. If the area ratio is 15% or less, more cracks will generate. The area ratio can be measured based on a randomly selected cross section in a thickness direction of the non-contiguous parts of the internal electrode.

Also according to the present invention, preferably the average grain size of the ceramic grains (randomly selected or all observed in a randomly selected area of a cross section of the dielectric layer) having the higher c/a in the non-contiguous parts of the internal electrode is 0.15 to 3.00 μm, as more cracks will generate when the average grain size is smaller than 0.15 μm or greater than 3.00 μm.

The average grain size of the ceramic grains having the higher c/a in the non-contiguous parts of the internal electrode is determined by the average grain size of $BaTiO_3$ which is the starting material for Ni electrode paste, where the smaller the average grain size of $BaTiO_3$, the greater the average grain size of the ceramic grains having the higher c/a in the non-contiguous parts of the internal electrode.

Also according to the present invention, generation of cracks can be prevented and a high apparent ∈ (permittivity) of 3000 or more can be achieved as long as the percentage occupied by the ceramics in the non-contiguous parts of the internal electrode is 8 to 40%. More cracks will generate if the percentage occupied by the ceramics is lower than 8%, and the apparent ∈ will drop if the percentage is greater than 40%.

Also according to the present invention, preferably the thickness of the internal electrode after sintering of the multilayer ceramic capacitor is 1.0 to 2.0 μm. In addition, preferably the material for internal electrodes is Ni.

The multilayer ceramic capacitor proposed by the present invention is manufactured through a normal process including: a step to add butyral, acrylic or other binder, and toluene, ethyl alcohol, or other solvent to a dielectric material to prepare a ceramic green sheet; a step to print a Ni or other internal electrode paste to a specified pattern on the surface of the obtained ceramic green sheet; a step to laminate the printed sheets thus obtained and then cut the laminated sheets to individual laminates; a step to form external electrodes made of Ni, ethyl cellulose, α-terpineol, etc., on each obtained laminate; and a step to remove the binder, followed by sintering. A method of forming external electrodes and removing the binder and then performing simultaneous sintering is preferred, but a method of removing the binder and performing sintering and then forming external electrodes can also be adopted. If necessary, re-oxidation process is performed and then Cu, Ni, Sn, or other plating is applied to the external electrode terminals to obtain a multilayer ceramic capacitor.

Preferably the dielectric material for the ceramic green sheets to be laminated is one whose primary component is barium titanate perovskite solid solution expressed by $BaTi_xZr_{(1-x)}O_3$ ($0.6 \leq x \leq 0.95$).

According to the present invention, the dielectric material (dielectric ceramic) may further contain an oxide of rare earth metal element in the form of 0.01 to 0.10 mol of rare earth metal element per 1 mol of the barium titanate perovskite solid solution, to lower E.

Preferably the oxide of rare earth metal element is at least one type of metal element selected from La, Ce, Pr, Nd, Sm, Eu, Gd, Tb, Dy, Ho, Er, Tm, Yb, Lu, and Y.

In addition, the dielectric material (dielectric ceramic) may also contain an oxide of Mg in the form of 0.005 to 0.050 mol of Mg element per 1 mol of the barium titanate perovskite solid solution, to lower E.

Furthermore, the dielectric material (dielectric ceramic) may contain an oxide of at least one type of element selected from Si, Al, Cr, Mn, Fe, Ni, Cu, Zn and V, as a sintering auxiliary.

Also according to the present invention, a $BaTiO_3$ powder is used as the common material to be added to the Ni internal electrode paste, and a metal powder for internal electrode, $BaTiO_3$ powder, organic vehicle, and solvent are blended together to prepare a printing paste.

EXAMPLES

The present invention is explained in greater detail below using examples, but it should be noted that the present invention is not at all limited to these examples.

Example 1

Preparation of Dielectric Material

A specified amount of barium titanate powder (of 0.31 μm in average grain size), and $Ho_2O_3$ (2 percent by weight), MgO (0.2 percent by weight), $MnCO_3$ (0.2 percent by weight), and $SiO_2$ (0.5 percent by weight) relative to 100 percent by weight of the barium titanate powder, were weighed. $BaCO_3$ was weighed so that the Ba/Ti ratio of the mixture after blending would become 1.000. These ingredients were wet-mixed and crushed in a ball mill to obtain a mixed powder. This mixed powder was used as the dielectric material.

(Preparation of Internal Electrode Printing Paste)

A $BaTiO_3$ powder was prepared as the common material. The grain size of the powder as calculated from a SEM image was 104 nm on average. Next, the lattice constant was obtained by WPPD (whole powder pattern decomposition) from the X-ray diffraction pattern of the powder, and the c/a was calculated as 1.0068.

Next, 20 parts by weight of this $BaTiO_3$ powder was added to 100 parts by weight of the 0.3-μm Ni metal powder for an internal electrode, to which ethyl cellulose and α-terpineol were further blended and the mixture was kneaded with three rollers to obtain an internal electrode printing paste.

(Preparation of Multilayer Ceramic Capacitor)

An acrylic organic binder and a solvent prepared by mixing toluene and ethyl alcohol were added to the dielectric material, and the mixture was applied using the doctor blade method to prepare a 5-μm green sheet. The obtained sheet was screen-printed with the internal electrode paste to form an internal electrode.

Three hundred internal electrode-printed sheets were stacked and cover sheets were laminated on top and bottom of the sheet stack to a thickness of 200 μm each. Thereafter, the sheets were thermally compressed to obtain a laminate, which was then cut to a specified shape.

Ni external electrodes were formed on the obtained laminate using the dip method, and after the binder was removed in a $N_2$ atmosphere, the laminate was sintered in a reducing atmosphere ($O_2$ partial pressure: $10^{-5}$ to $10^{-8}$ atom) at 1260° C. to obtain a sintered compact. The shape dimensions were L (length)=3.2 mm, W (width)=1.6 mm, and T (thickness)=1.6 mm.

The sintered compact was re-oxidized in a $N_2$ atmosphere at 800° C., and then the surfaces of the external electrode terminals were coated with Cu, Ni, and Sn metals by means of electroplating, to obtain a multilayer ceramic capacitor.

The thickness of the Ni internal electrode after sintering was 1.2 μm.

(Evaluation of Obtained Multilayer Ceramic Capacitor)

The obtained multilayer ceramic capacitor was evaluated, using the methods explained below, for the average grain size of the ceramic grains having the higher c/a in the non-contiguous parts of the internal electrode, crystal axis ratio c/a of the ceramic grains of the higher c/a, area ratio (%) of the ceramic grains having the higher c/a, percentage (%) of the internal electrode occupied by the ceramics, crack generation ratio, and apparent dielectric constant (∈).

[Measurement Method of Crystal Axis Ratio c/a]

The crystal axis ratio c/a was measured according to the CBED (convergent beam electron diffraction) method, or specifically by obtaining the lattice constant (crystal axis values a, b and c) by paying attention to the positions of higher-order Laue zone (HOLZ) lines found in the CBED patterns observed using a transmission electron microscope (TEM).

The c/a of the ceramic grains (randomly selected) constituting the dielectric layer was measured, after which c/a was measured for all ceramic grains in the non-contiguous parts (or all ceramic grains in one or more randomly selected locations of the non-contiguous parts), to identify the ceramic grains having a c/a higher than the c/a of the ceramic grains constituting the dielectric layer.

[Grain Size of Ceramic Grains Having Higher c/a]

The grain sizes of the ceramic grains having the higher c/a in the non-contiguous parts were measured using a TEM image. The average grain size was calculated from a sample N of 100.

[Area of Ceramic Grain]

For the area of ceramic grains, the maximum size A in the direction parallel with the internal electrode and maximum size B in the direction orthogonal to the internal electrode were measured, and the grain size was calculated by the formula "(A+B)/2." The area of a circle whose diameter corresponds to this grain size was adopted as the area of ceramic grain.

[Calculation of Area Ratio]

The area ratio was calculated by using the sum of areas of all ceramic grains in the non-contiguous parts (or of all ceramic grains in one or more randomly selected locations of the non-contiguous parts) as the denominator, and sum of areas of ceramic grains having the higher c/a as the numerator. The area ratio was measured in at least 20 non-contiguous parts.

[Percentage of Internal Electrode Occupied by Ceramics]

The multilayer ceramic capacitor was polished, and a randomly selected area thereof was then observed with a SEM. The respective dimensions (of the Ni electrode, ceramic part, and pore) were measured along the Ni internal electrode, and the percentage of the entire electrode occupied by the ceramic was calculated arithmetically.

[Crack Generation Ratio]

The capacitor was soaked in 270° C. molten solder for 3 seconds to evaluate the resistance against solder heat. After removing the capacitor from the solder, an optical microscope of ×50 magnification was used to count the number of cracks that had generated on the surface of the capacitor.

[Evaluation Method of Dielectric Constant]

The capacitance was measured using the LCR Meter 4284A by Hewlett-Packard. The apparent dielectric constant was calculated using the value measured above, as well as the crossing area of the internal electrodes in the sample multilayer capacitor, thickness of the dielectric ceramic layer, and number of laminated layers. A sample size of 50 was used.

The results are shown in Table 1 below.

TABLE 1

| Example/ Comparative Example | Common material ($BaTiO_3$) Average grain size (nm) | Common material ($BaTiO_3$) Crystal axis ratio c/a | Ni paste Amount of common material added per 100 parts by weight of Ni metal powder (parts by weight) | Structure Average grain size of ceramic grains of higher c/a in non-contiguous parts of internal electrode (μm) | Structure c/a of ceramic grains of higher of c/a in non-contiguous parts of internal electrode (*) | Structure Area ratio of ceramic grains higher c/a in non-contiguous parts of internal electrode (%) | Percentage of internal electrode occupied by ceramic (%) | Crack generation ratio (%) | Apparent ε |
|---|---|---|---|---|---|---|---|---|---|
| Example 1 | 104 | 1.0068 | 20 | 0.93 | 1.010 | 27 | 23.5 | 0 | 3240 |
| Comparative Example 1 | 97 | 1.0037 | 20 | — | — | 0 | 25.2 | 4 | 3220 |
| Comparative Example 2 | 98 | 1.0046 | 20 | 1.2 | 1.010 | 8 | 23.9 | 3 | 3360 |
| Example 2 | 102 | 1.0053 | 20 | 1.03 | 1.010 | 16 | 25.1 | 0 | 3340 |
| Example 3 | 108 | 1.0074 | 20 | 0.6 | 1.009 | 49 | 24.4 | 0 | 3260 |
| Comparative Example 3 | 130 | 1.0076 | 20 | 0.13 | 1.010 | 43 | 24.7 | 3 | 3290 |
| Example 4 | 123 | 1.0070 | 20 | 0.28 | 1.009 | 36 | 25.5 | 0 | 3280 |
| Example 5 | 102 | 1.0069 | 20 | 0.66 | 1.009 | 35 | 24.8 | 0 | 3310 |
| Example 6 | 75 | 1.0066 | 20 | 1.9 | 1.010 | 26 | 25.2 | 0 | 3290 |
| Example 7 | 53 | 1.0059 | 20 | 2.75 | 1.011 | 23 | 24.4 | 0 | 3360 |
| Comparative Example 4 | 23 | 1.0055 | 20 | 4.18 | 1.011 | 17 | 24.1 | 4 | 3230 |
| Comparative Example 5 | 104 | 1.0068 | 5 | 0.94 | 1.010 | 26 | 5.7 | 3 | 3570 |
| Example 8 | 104 | 1.0068 | 7 | 0.96 | 1.010 | 25 | 8.4 | 0 | 3340 |
| Example 9 | 104 | 1.0068 | 30 | 0.89 | 1.010 | 24 | 36.5 | 0 | 3110 |
| Comparative Example 6 | 104 | 1.0068 | 40 | 0.9 | 1.010 | 26 | 43.3 | 0 | 2890 |

(*): The c/a of the grains constituting the dielectric layer is 1.007.

Examples 2 to 7 and Comparative Examples 1 to 4

A multilayer ceramic capacitor was obtained in the same manner as in Example 1, except that a $BaTiO_3$ powder of each grain size and crystal axis ratio c/a specified in Table 1 was used for the common material.

Table 1 shows the results of evaluating the obtained multilayer ceramic capacitors in the same manner as in Example 1.

As is evident in Table 1, generation of cracks was prevented when, among the ceramic grains present in the non-contiguous parts of the Ni internal electrodes, the ceramic grains having a crystal axis ratio c/a higher than that of the ceramic grains constituting the dielectric ceramic layer was 15% or more in area ratio in the non-contiguous parts, but more cracks generated when the area ratio was smaller.

It is also clear that the area ratio of the ceramic grains having a higher crystal ratio c/a than that of the ceramic grains constituting the dielectric ceramic layer would be determined by the c/a of the $BaTiO_3$ material, where a higher c/a would lead to a higher area ratio. In the above Examples, the c/a of the $BaTiO_3$ material had to be 1.0050 or more.

Additionally, the average grain size of the ceramic grains of the higher c/a in the non-contiguous parts of the Ni internal electrode was 0.15 to 3.00 μm, and more cracks generated when the average grain size was smaller or greater than this range.

Moreover, the average grain size was determined by the average grain size of the starting $BaTiO_3$ material, where, the smaller the grain size of the $BaTiO_3$ material, the greater the average grain size of the ceramic grains of the higher c/a became, and the average grain size of $BaTiO_3$ materials used in these Examples was roughly 125 μm or less.

Examples 8 and 9 and Comparative Examples 5 and 6

A multilayer ceramic capacitor was obtained in the same manner as in Example 1, except that the amount of $BaTiO_3$ powder added per 100 parts by weight of the Ni metal powder for the internal electrode (parts by weight) was changed to each amount specified in Table 1.

Table 1 shows the results of evaluating the obtained multilayer ceramic capacitors in the same manner as in Example 1.

As is evident in Table 1, generation of cracks was prevented and sufficiently high apparent ∈ (3000 or more in this composition) was obtained when the percentage of the Ni internal electrode occupied by the ceramic was 8 to 40%, but more cracks generated when the percentage was smaller than this range and apparent ∈ dropped when the percentage was greater than this range.

Additionally, the percentage occupied by the ceramic was determined by the amount of common material added, and in the aforementioned Examples, the amount of $BaTiO_3$ powder added was 7 to 30 parts by weight per 100 parts by weight of the Ni metal powder for internal electrode.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-210503, filed Sep. 25, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having multiple laminated dielectric ceramic layers made of a dielectric ceramic, internal electrodes formed between the dielectric ceramic layers, and external electrodes electrically connected to the internal electrodes, each internal electrode including non-contiguous parts along a direction in which the internal electrode extends as a result of sintering, wherein:

ceramic grains having a crystal axis ratio c/a are present in the non-contiguous parts of the internal electrodes between the dielectric ceramic layers by an area ratio of 15% or more in the non-contiguous parts as measured in a cross section in a thickness direction of the non-contiguous parts of the internal electrodes, wherein the crystal axis ratio c/a of the ceramic grains present in the non-contiguous parts of each internal electrode is higher than that of all ceramic grains constituting the dielectric ceramic layer in contact with the internal electrode.

2. A multilayer ceramic capacitor according to claim 1, wherein an average grain size of the ceramic grains present in the non-contiguous parts is 0.15 to 3.00 μm.

3. A multilayer ceramic capacitor according to claim 1, wherein a percentage of the internal electrode occupied by the ceramic is 8 to 40%.

4. A multilayer ceramic capacitor according to claim 2, wherein a percentage of the internal electrode occupied by the ceramic is 8 to 40%.

5. A multilayer ceramic capacitor according to claim 1, wherein the dielectric ceramic layer is made of a dielectric ceramic whose primary component is barium titanate perovskite solid solution.

6. A multilayer ceramic capacitor according to claim 2, wherein the dielectric ceramic layer is made of a dielectric ceramic whose primary component is barium titanate perovskite solid solution.

7. A multilayer ceramic capacitor according to claim 3, wherein the dielectric ceramic layer is made of a dielectric ceramic whose primary component is barium titanate perovskite solid solution.

8. A multilayer ceramic capacitor according to claim 4, wherein the dielectric ceramic layer is made of a dielectric ceramic whose primary component is barium titanate perovskite solid solution.

* * * * *